United States Patent
Park et al.

(10) Patent No.: US 8,305,930 B2
(45) Date of Patent: Nov. 6, 2012

(54) HYBRID CLUSTERING BASED DATA AGGREGATION METHOD FOR MULTI-TARGET TRACKING IN WIRELESS SENSOR NETWORK

(75) Inventors: Sang Joon Park, Daejeon (KR); Young Bae Ko, Suwon Si (KR); Woo Sung Jung, Suwon Si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 802 days.

(21) Appl. No.: 12/425,914

(22) Filed: Apr. 17, 2009

(65) Prior Publication Data

US 2010/0090823 A1  Apr. 15, 2010

(30) Foreign Application Priority Data

Oct. 9, 2008  (KR) .................. 10-2008-0099340

(51) Int. Cl.
*H04L 12/28* (2006.01)
*H04L 12/56* (2006.01)
*G06F 15/173* (2006.01)

(52) U.S. Cl. ......... 370/254; 370/252; 370/408; 709/224

(58) Field of Classification Search .................. None
See application file for complete search history.

(56) References Cited

U.S. PATENT DOCUMENTS

| | | | |
|---|---|---|---|
| 5,495,479 A * | 2/1996 | Galaand et al. ............... | 370/404 |
| 6,826,607 B1 | 11/2004 | Gelvin et al. | |
| 2007/0233835 A1* | 10/2007 | Kushalnagar et al. ........ | 709/223 |
| 2011/0188378 A1* | 8/2011 | Collins et al. ................. | 370/236 |

FOREIGN PATENT DOCUMENTS

| | | |
|---|---|---|
| JP | 01-119437 A | 5/1989 |
| JP | 05-016692 A | 1/1993 |
| KR | 1019990020669 A | 3/1999 |
| KR | 1020040023394 A | 3/2004 |
| KR | 1020060074680 A | 7/2006 |
| KR | 1020070063118 A | 6/2007 |
| KR | 100775504 B1 | 11/2007 |

OTHER PUBLICATIONS

International Search Report of International Application No. PCT/KR2007/005188 filed on Oct. 23, 2007.
Korean Intellectual Property Office, Notice of Allowance, Appln. No. 10-20080099340, dated Nov. 30, 2010.

* cited by examiner

*Primary Examiner* — Clemence Han

(74) *Attorney, Agent, or Firm* — Kile Park Goekjian Reed & McManus PLLC

(57) ABSTRACT

Provided are a sensor network structure, a data aggregation method, and a clustering method for efficient multi-target tracking. The multi-target tracking may be efficiently performed in a heterogeneous sensor network by combining clustering methods and adaptively varying the clustering methods. As such, an energy consumption problem in a sensor network may be reduced, and a data transmission delay problem or a data traffic problem may be solved by reducing the amount of data to be transmitted.

14 Claims, 11 Drawing Sheets

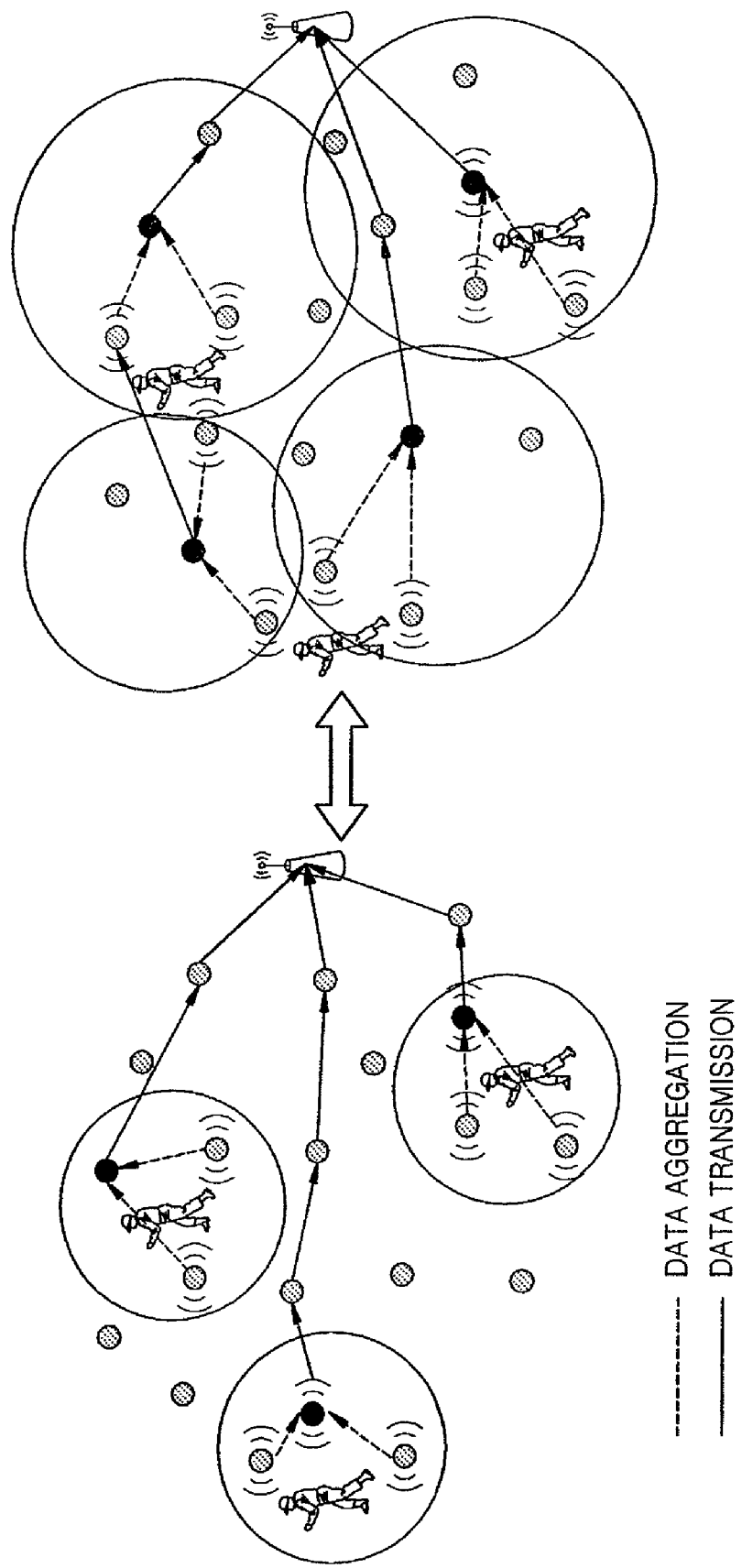

CHANGE DATA AGGREGATION METHOD

○ SENSOR NODE
● CLUSTER HEAD
◉ BACKBONE NODE
▽ TARGET

STATIC CLUSTERING DATA AGGREGATION

○ SENSOR NODE
● CLUSTER HEAD
◉ BACKBONE NODE
▽ TARGET

HYBRID CLUSTERING BASED DATA AGGREGATION METHOD FOR MULTI-TARGET TRACKING IN WIRELESS SENSOR NETWORK

CROSS-REFERENCE TO RELATED PATENT APPLICATION

This application claims the benefit of Korean Patent Application No. 10-2008-0099340, filed on Oct. 9, 2008, in the Korean Intellectual Property Office, the disclosure of which is incorporated herein in its entirety by reference.

BACKGROUND OF THE INVENTION

1. Field of the Invention

The present invention relates to data aggregation, and more particularly, to a sensor network configuration, a data aggregation method, and a clustering method, capable of efficiently tracking multiple targets.

2. Description of the Related Art

A wireless sensor network obtains useful information by collecting data regarding physical phenomena or regarding certain objects which are sensed by using sensors which are randomly arranged, through wireless multi-hop communication.

In general, sensors in a sensor network are randomly arranged in a target area and sensing data is packetized and wirelessly transmitted to a sink node that is a kind of collection node. In most cases, sensor nodes are located at dangerous or isolated places which people cannot easily access and thus cannot be infinitely supplied with energy. Accordingly, energy exhaustion can be a serious problem and much research is being conducted into solving this energy exhaustion problem.

As an application technology in the wireless sensor network, a target tracking technology has the purpose of monitoring and tracking a target such as an animal, a soldier, a vehicle, poison gas, etc., by sensing locations and behaviors of the target. However, due to various characteristics such as mobility and variations in size or volume of the target, a network layer and a media access control (MAC) layer for a general sensor network cannot be easily used because a protocol for a conventional sensor network cannot effectively control excessive data created by a moving target, or control an appropriate sleep schedule.

SUMMARY OF THE INVENTION

The present invention provides an efficient multi-target tracking method in a heterogeneous sensor network by combining clustering methods and adaptively varying the clustering methods.

The present invention also provides a method of reducing an energy consumption problem, and a method of solving a data transmission delay problem or a data traffic problem by reducing an amount of data to be transmitted.

The other objects and advantages of the present invention can be understood and will become clearer through embodiments disclosed in the detailed description of the invention. In addition, it can be understood that the objects and advantages of the present invention will be implemented by constructions and features disclosed in the claims and a combination thereof.

According to an aspect of the present invention, there is provided a sensor network for multi-target tracking, the sensor network including sensor nodes which are randomly arranged in the sensor network and sense a target; and a backbone node which covers one of a plurality of backbone networks formed in the sensor network, and relays target sensing data of sensor nodes in a corresponding backbone network, to a sink node.

According to another aspect of the present invention, there is provided a clustering based data aggregation method for multi-target tracking in a sensor network, the method including selecting a cluster head from a cluster in a backbone network based on hop counts to a backbone node for relaying target sensing data from sensor nodes in the backbone network to a sink node; and transmitting target sensing data to the cluster head such that the cluster head aggregates target sensing data of sensor nodes included in the cluster and transmits the aggregated target sensing data to the backbone node.

According to another aspect of the present invention, there is provided a clustering based data aggregation method for multi-target tracking in a sensor network, the method including determining a data aggregation method based on hop counts to a backbone node for relaying target sensing data from sensor nodes in a backbone network to a sink node; and transmitting target sensing data to the backbone node through a cluster head of a cluster which is formed between sensor nodes in the backbone network, according to the determined data aggregation method.

According to another aspect of the present invention, there is provided a clustering based data aggregation method for multi-target tracking in a sensor network, the method including checking reception traffic by using a backbone node for relaying target sensing data from sensor nodes in a backbone network to a sink node; and flooding the backbone network with control messages for changing a data aggregation method of the sensor nodes in the backbone network, based on the reception traffic.

According to another aspect of the present invention, there is provided a clustering method for multi-target tracking in a sensor network, the method including temporarily forming a cluster with respect to a target which is sensed by sensor nodes of which hop counts to a backbone node for relaying target sensing data from sensor nodes in a backbone network to a sink node, are greater than a preset first reference value, and aggregating target sensing data by using a cluster head which is selected from among sensor nodes in the cluster; and transmitting target sensing data to a cluster head of a preset cluster by using sensor nodes of which hop counts to the backbone node are less than the first reference value and are greater than a preset second reference value, and aggregating the target sensing data by using the cluster head.

According to another aspect of the present invention, there is provided a clustering method for multi-target tracking in a sensor network, the method including, if reception traffic of a backbone node for relaying target sensing data from sensor nodes in a backbone network to a sink node, is greater than a preset threshold value, changing to a static data aggregation method in which each sensor node transmits target sensing data to a cluster head of a preset cluster and the cluster head aggregates the target sensing data and transmits the aggregated target sensing data, by the control of the backbone node; and, if the reception traffic is less than the threshold value, changing to a dynamic data aggregation method in which a cluster is temporarily formed between sensor nodes which have sensed a target, and a cluster head selected from among the sensor nodes in the cluster aggregates target sensing data and transmits the aggregated target sensing data to the backbone node, by the control of the backbone node.

According to another aspect of the present invention, there is provided a computer readable recording medium having recorded thereon a computer program for executing each of the clustering method and the clustering based data aggregation method for multi-target tracking in a sensor network.

BRIEF DESCRIPTION OF THE DRAWINGS

The above and other features and advantages of the present invention will become more apparent by describing in detail exemplary embodiments thereof with reference to the attached drawings in which:

FIGS. 5 and 6A through 6D are schematic diagrams for describing an adaptive clustering based data aggregation method according to an embodiment of the present invention;

DETAILED DESCRIPTION OF THE INVENTION

Figure 1:
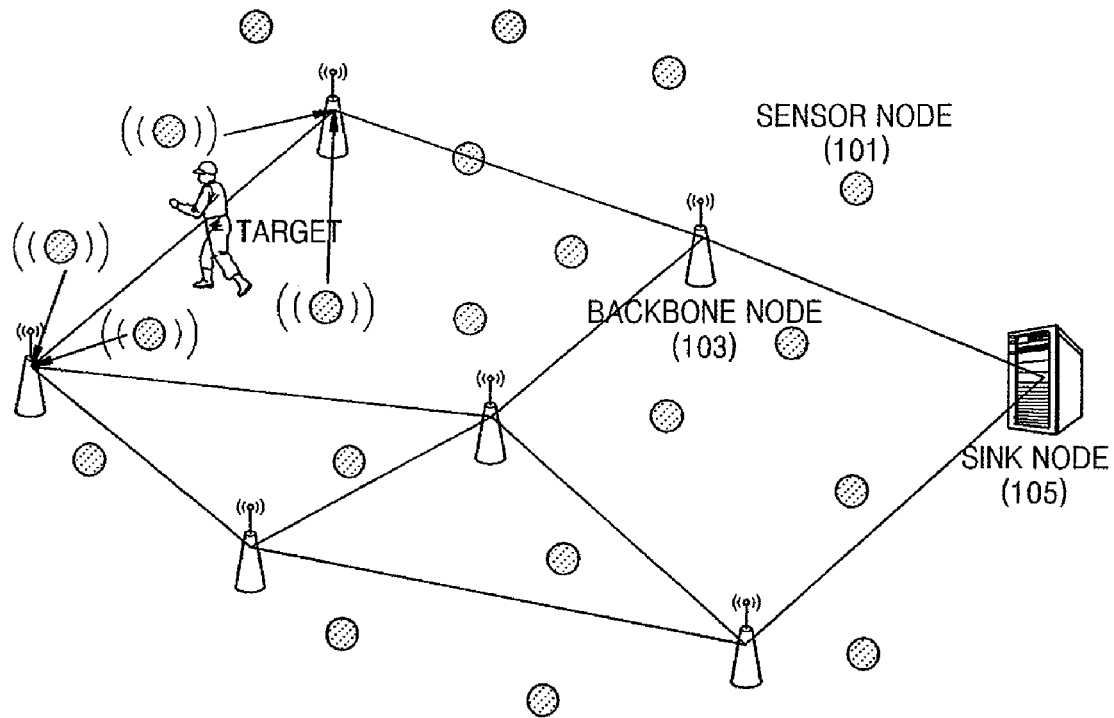
FIG. 1 is a schematic diagram of a heterogeneous sensor network for efficient multi-target tracking, according to an embodiment of the present invention.

Hereinafter, the present invention will be described in detail by explaining embodiments of the invention with reference to the attached drawings. Like reference numerals in the drawings denote like elements. In the following description of the present invention, a detailed description of known functions and configurations incorporated herein will be omitted when it may make the subject matter of the present invention unclear.

Unless defined differently, the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

The present invention analyzes a conventional topology control method for data aggregation and conventional algorithms for target tracking, provides an efficient multi-target tracking method in a wireless sensor network of a hierarchical structure, and suggests a clustering method for efficient data aggregation.

The present invention includes first, an appropriate topology and network structure for multi-target tracking, second, a hybrid clustering based data aggregation method in which clustering based methods are combined, and third, a data aggregation method for adaptively selecting clustering methods based on conditions of a network. The data aggregation method can reduce energy consumption, data transmission delay, and data traffic by collecting various pieces of repeated data and transmitting the collected data to a sink node.

FIG. 1 is a schematic diagram of a heterogeneous sensor network for efficient multi-target tracking, according to an embodiment of the present invention.

Referring to FIG. 1, the sensor network includes sensor nodes 101, backbone nodes 103, and a sink node 105.

The sensor nodes 101 generally sense a target or an event and transmit the sensing data to the sink node 105. The sensor nodes 101 have low power characteristics and include low-speed antennas. The power of the sensor nodes 101 can be easily exhausted. The sensing data may include various types of information such as the target's movement, speed, temperature, etc. The sensor nodes 101 are randomly arranged and use a low-speed low-efficiency protocol, for example, an Institute of Electrical and Electronics Engineers (IEEE) 802.15.4 protocol or a sensor media access control (S-MAC) protocol. Each of the sensor nodes 101 transmits target sensing data to a cluster head of a corresponding cluster included in a backbone network, for data aggregation, based on a hop count from the backbone nodes 103.

The backbone nodes 103 are connected with the sensor nodes 101 and the sink node 105 in a mesh shaped network, aggregate data of the sensor nodes 101, and transmit the aggregated data to the sink node 105. The backbone nodes 103 perform better than the sensor nodes 101 and thus can perform more complicated operations. The backbone nodes 103 are evenly arranged so as to cover the entire sensor network, and each of the backbone nodes 103 covers one of a plurality of backbone networks included in the entire sensor network and relays target sensing data from a sensor node 101 in a corresponding backbone network, to the sink node 105. The backbone nodes 103 use a high-speed protocol having a high efficiency, for example, an IEEE 802.11 protocol in order to communicate with each other or with the sink node 105, and also use a low-speed protocol having a low efficiency in order to receive data from the sensor nodes 101. The backbone nodes 103 dynamically change target sensing data aggregation methods of the sensor nodes 101 included in corresponding backbone networks, based on reception traffic.

The sink node 105 collects the target sensing data of the sensor nodes 101 in the sensor network and provides the collected and aggregated data to a user through an external network.

In a general singular sensor network, a single sink node should process all data traffic created when multiple targets are tracked. As a result, a data transmission path created after sensing a target can overlap with other data transmission paths, data transmission delay increases, and data transmission can fail. Even in the singular sensor network, only low-speed protocols having low efficiencies are used. In this case, a data transmission speed from a sensor node to the sink node is reduced.

In order to solve the above problems, the present invention applies the heterogeneous sensor network illustrated in FIG. 1. As such, even when multiple targets occur in various places in the sensor network, target sensing data may be separately processed and a small amount of data obtained by aggregating the target sensing data may be transmitted to a sink node at high speed.

Initially, a network formed between a sink node, backbone nodes, and sensor nodes in a network initializing operation by flooding the network with control messages. Hop counts between the sensor nodes and the backbone nodes or the sink node are determined and all of the sensor nodes transmit data to the sink node through the backbone nodes. When the network is formed, clusters between the sensor nodes are formed by using various protocols such as low-energy adaptive clustering hierarchy (LEACH) protocols and a certain static cluster head is selected from each cluster. Clusters and cluster heads may be selected to be periodically changed in order to prevent energy of a certain node from being exhausted.

The heterogeneous sensor network according to an embodiment of the present invention has a hierarchical structure and data is aggregated by combining a static clustering method and a dynamic clustering method. The present invention includes a hybrid clustering based data aggregation method in which a static clustering based data aggregation method is combined with a dynamic clustering based data aggregation method, and an adaptive clustering based data aggregation method.

Hereinafter, the static clustering based data aggregation method is referred to as a static data aggregation method, the dynamic clustering based data aggregation method is referred to as a dynamic data aggregation method, the hybrid clustering based data aggregation method is referred to as a hybrid data aggregation method, and the adaptive clustering based data aggregation method is referred to as an adaptive data aggregation method.

Figure 2:
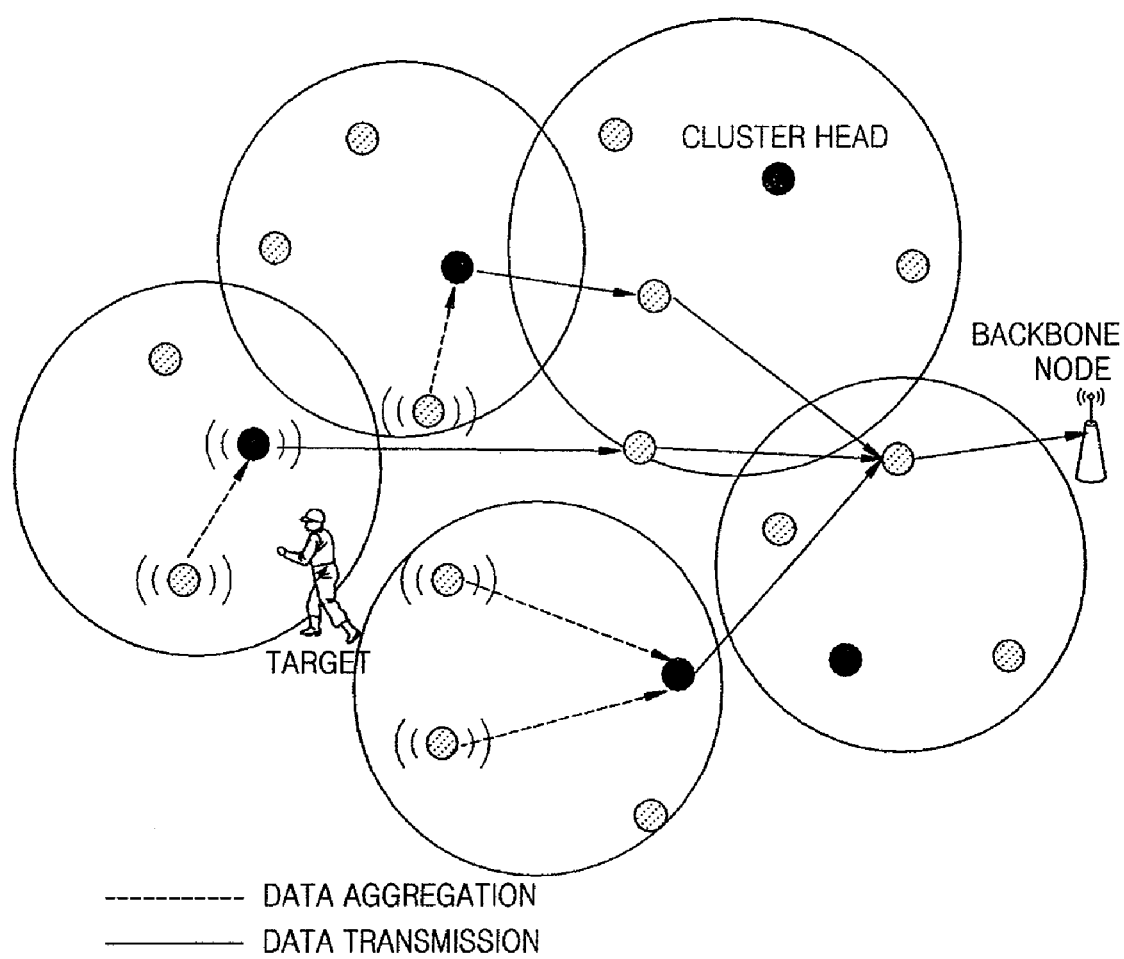
FIG. 2 is a schematic diagram for describing a static clustering based data aggregation method according to an embodiment of the present invention.

FIG. 2 is a schematic diagram for describing a static data aggregation method according to an embodiment of the present invention.

The static data aggregation method uses static clusters which are preset in a network. Sensor nodes included in a cluster are referred to as cluster nodes and a cluster head is a cluster node that controls scheduling of the cluster and aggregates data of the other cluster nodes in the cluster.

In the static data aggregation method, all cluster nodes that have sensed a target transmits data to preselected cluster heads adjacent to the cluster nodes, and the cluster heads aggregates the data and transmits the aggregated data to a sink node through backbone nodes. If only the static data aggregation method is used, data is aggregated by using preset clusters. Thus, a delay time for additionally forming clusters does not exist and the data may be transmitted at high speed.

Each sensor node that has sensed the target transmits data to a cluster head included in a cluster including the sensor node and the cluster head transmits the data to the sink node through the backbone node by using a preset path.

Figure 3:
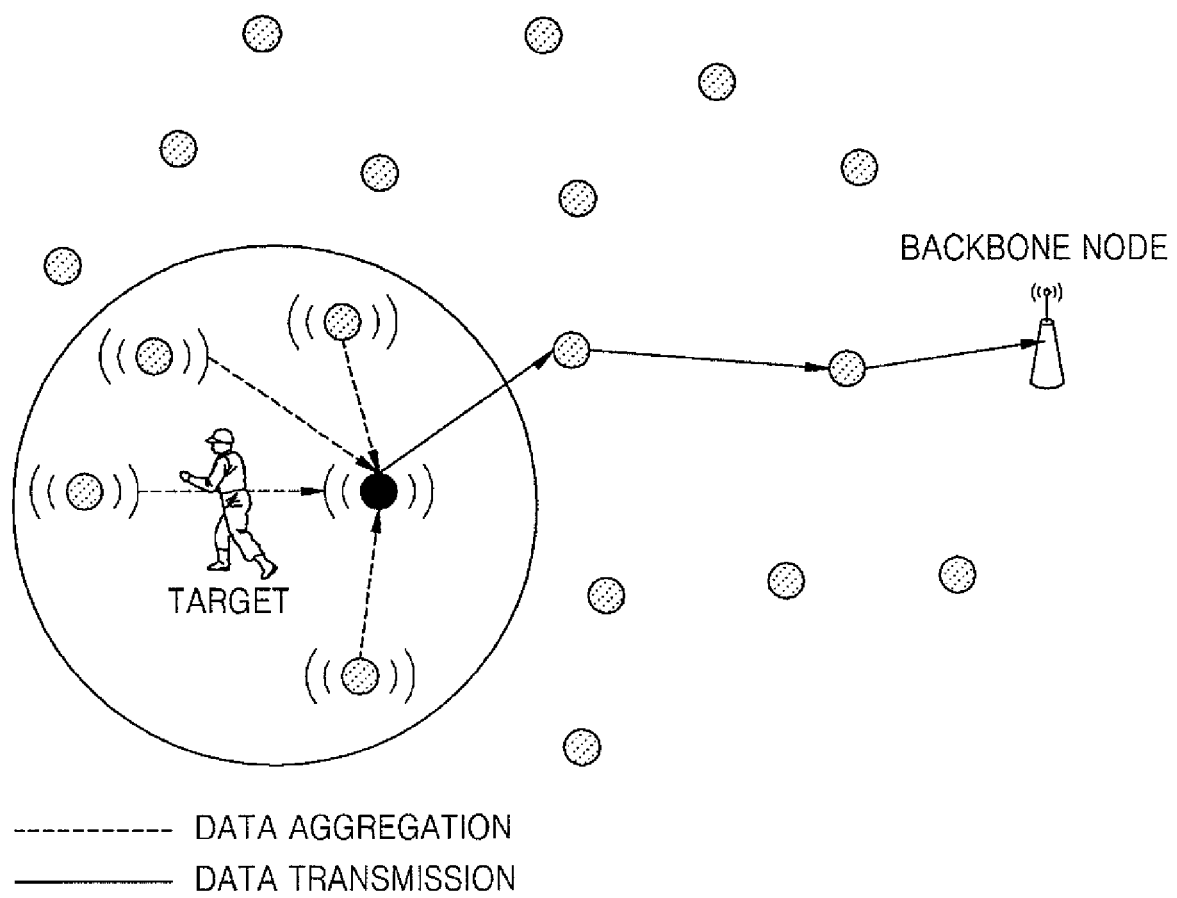
FIG. 3 is a schematic diagram for describing a dynamic clustering based data aggregation method according to an embodiment of the present invention.

FIG. 3 is a schematic diagram for describing a dynamic data aggregation method according to an embodiment of the present invention.

The dynamic data aggregation method aggregates data by using sensor nodes that have sensed a target. The sensor nodes that have sensed the target temporarily form a cluster and the cluster is released when the target moves or an event terminates. One of cluster nodes is selected as a cluster head, and the cluster head aggregates received data and transmits the aggregated data to a sink node through a backbone node. As such, data aggregation is always performed adjacent to the target and thus the data may be perfectly aggregated. The dynamic data aggregation method is advantageous when the target is far apart from the backbone node or the sink node.

A cluster node that is the closest to the target or the event, or has a highest energy, from among the cluster nodes, may be selected as the cluster head. Alternatively, various methods may be used to select the cluster head.

Figure 4:
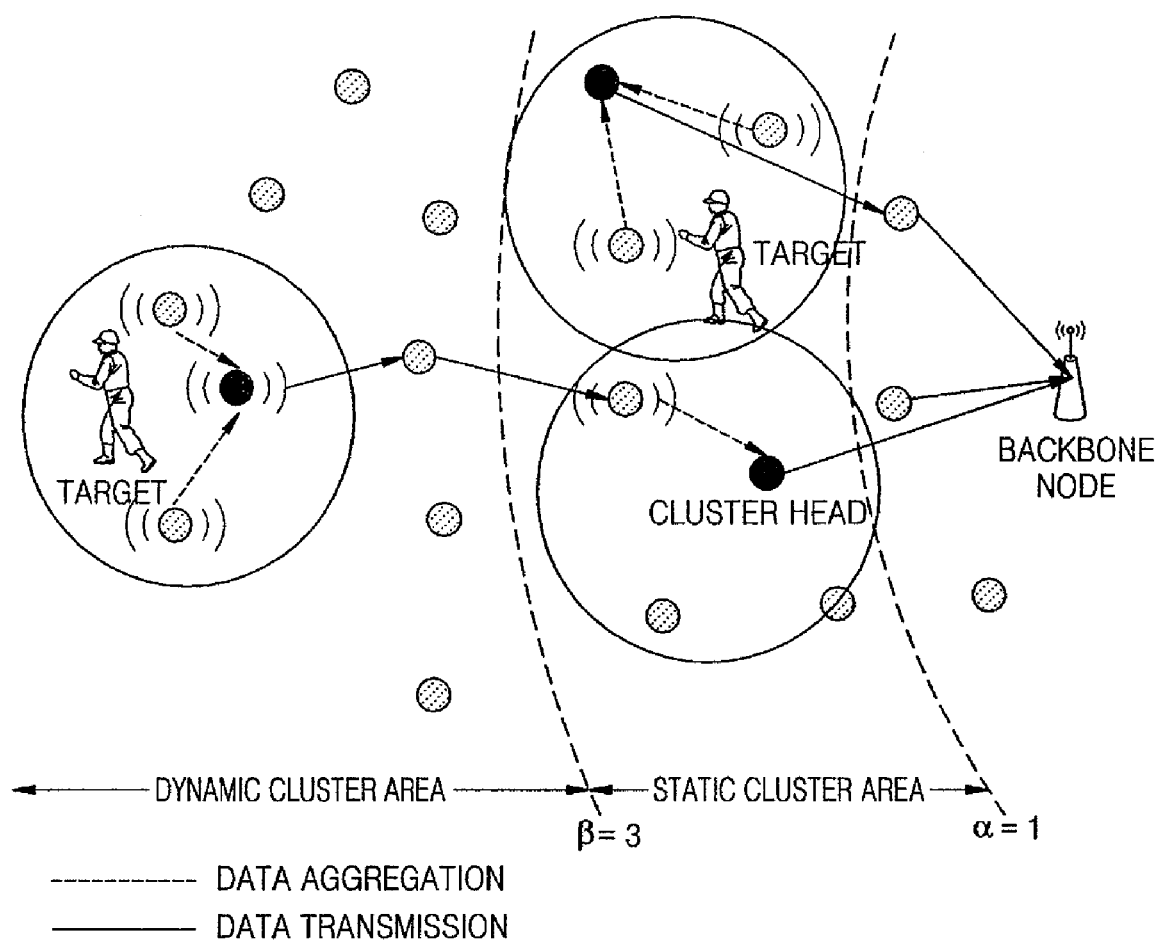
FIG. 4 is a schematic diagram for describing a hybrid clustering based data aggregation method according to an embodiment of the present invention.

FIG. 4 is a schematic diagram for describing a hybrid data aggregation method according to an embodiment of the present invention.

The hybrid data aggregation method is obtained by combining the static data aggregation method described above in FIG. 2 with the dynamic data aggregation method described above in FIG. 3, and coverage of each of the static and dynamic data aggregation methods may vary according to a state of a network.

If a target is sensed in a backbone network that is a sensing area covered by a single backbone node, sensor nodes may directly transmit data to the backbone node. However, in this case, data of the sensor nodes are not aggregated and thus, various problems may occur. In order to solve these problems, the hybrid data aggregation method is suggested.

After the network and static clusters are formed, each sensor node selects one of the static and dynamic data aggregation methods by using reference values $\alpha$ and $\beta$. The reference value $\alpha$ is a preset value for starting the static data aggregation method and the reference value $\beta$ is a preset value for starting the dynamic data aggregation method.

Each sensor node may select its data aggregation method based on the reference values $\alpha$ and $\beta$ which are determined by a user. The reference values $\alpha$ and $\beta$ may be flexibly determined according to the state of the network, for example, according to hop counts from the sensor nodes to the backbone node. A large static cluster area (a large reference value $\beta$) is effective when a large number of targets exist in the network and a large dynamic cluster area (a small reference value $\beta$) is effective when a small number of targets exist in the network.

Sensor nodes having hop counts smaller than the reference value $\alpha$ are close to the backbone node and thus directly transmit data to the backbone node without using any data aggregation method.

Sensor nodes having hop counts between the reference values $\alpha$ and $\beta$ select the static data aggregation method and thus transmit data to preselected cluster heads. The cluster heads aggregate data and transmit the aggregated data to the backbone node.

Sensor nodes having hop counts larger than the reference value $\beta$ select the dynamic data aggregation method. Thus, a cluster is temporarily formed and data is aggregated, between sensor nodes that have sensed the target.

Referring to FIG. 4, the reference values $\alpha$ and $\beta$ are respectively set as values 1 and 3. Sensor nodes that have sensed a target located in a dynamic cluster area beyond the reference value $\beta$, aggregate target sensing data and transmit the aggregated data, by using the dynamic data aggregation method. Sensor nodes that have sensed a target located in a static cluster area between the reference values $\alpha$ and $\beta$, aggregate target sensing data and transmit the aggregated data, by using the static data aggregation method.

FIGS. 5 and 6A through 6D are schematic diagrams for describing an adaptive data aggregation method according to an embodiment of the present invention.

The adaptive data aggregation method selectively applies one of the static data aggregation method described above in FIG. 2 and the dynamic data aggregation method described above in FIG. 3 according to a state of a network, i.e., current data traffic of the network, to each backbone network.

Fast movement of a target or multiple targets may be sensed even in an area covered by a single backbone node, and thus a large amount of data may occur. Accordingly, the backbone node may improve efficiency of the network by selecting one of the static and dynamic data aggregation methods according to the amount of data.

In general, when a small number of targets exist or a target moves at a low speed, the dynamic data aggregation method using only sensor nodes around the target(s) is efficient. On the other hand, when a large number of targets exist or a target moves at high speed, the dynamic data aggregation method should form clusters very often and thus has a lower efficiency than the static data aggregation method in which clusters are preset. Accordingly, the network selects the static data aggregation method when the data traffic is high and data aggregation method switching is adaptively performed to switch to the dynamic data aggregation method when the data traffic is low. A threshold value for the data aggregation method switching and an initial data aggregation method of the network are determined by the backbone node.

Referring to FIG. 5, the threshold value is set in the network and, if the data traffic in the backbone node is greater than the threshold value, data aggregation method switching is performed by switching the dynamic data aggregation method to the static data aggregation method by flooding the network with control messages. On the other hand, if the data traffic is less than the threshold value, the data aggregation method switching is performed to switch to the dynamic data aggregation method by flooding the network with control messages. The data aggregation method switching may be frequently performed in consideration of the performance of the network.

Figure 6A:
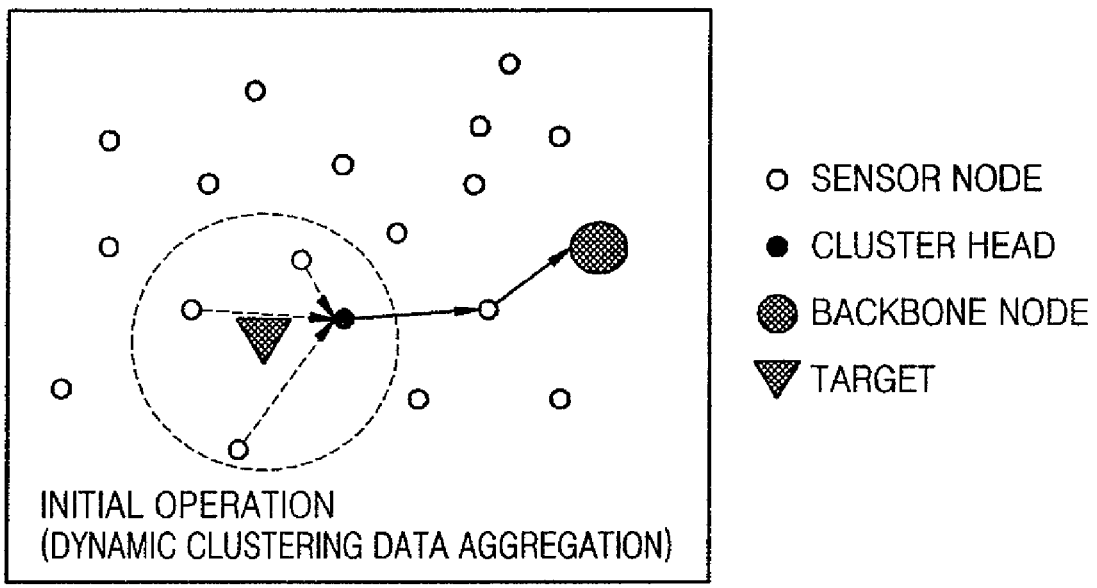

Referring to FIG. 6A, initially, the dynamic data aggregation method is performed. In this case, the threshold value of the data traffic is also set. If data is received beyond the threshold value, the backbone node determines that the dynamic data aggregation method is not appropriate for the network any more.

Figure 6B:
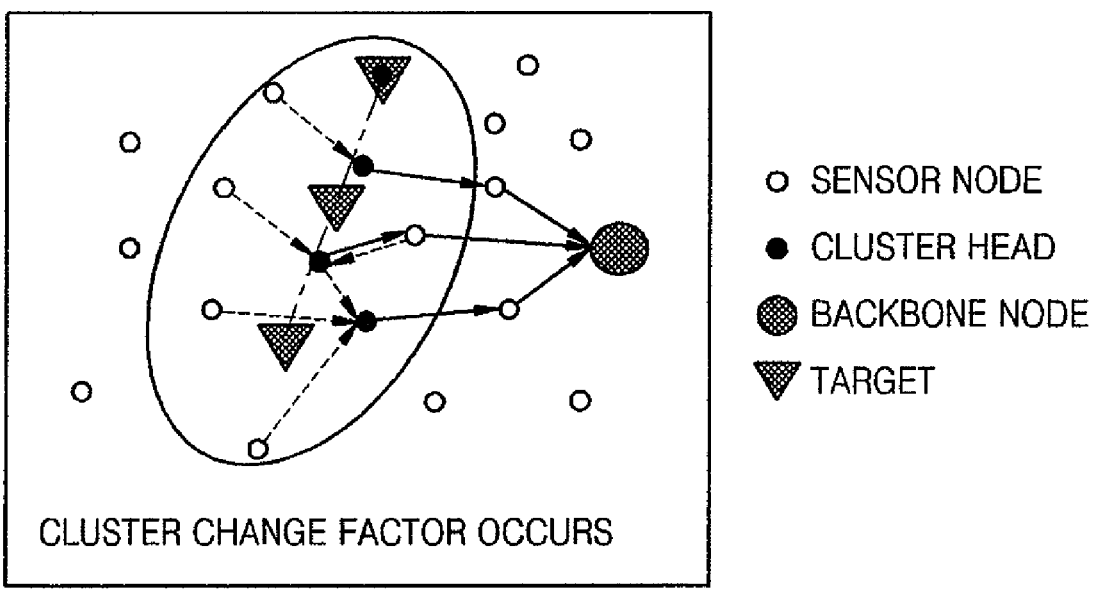

Referring to FIG. 6B, a plurality of cluster heads are selected as a target moves and thus data may not be easily aggregated.

Figure 6C:
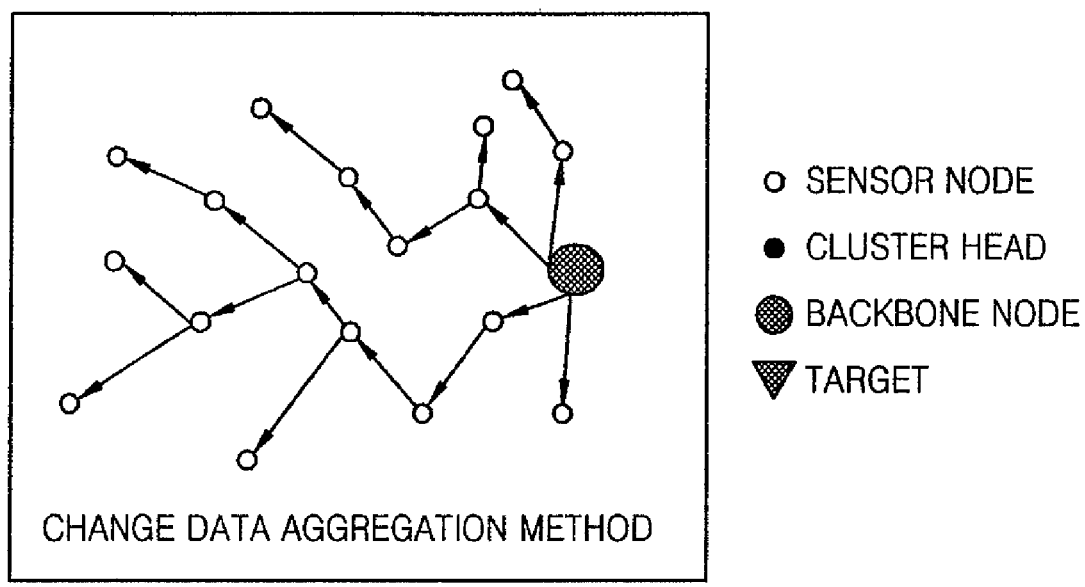

Referring to FIG. 6C, the backbone node floods the network with control messages and switches a corresponding network from the dynamic data aggregation method to the static data aggregation method.

Figure 6D:
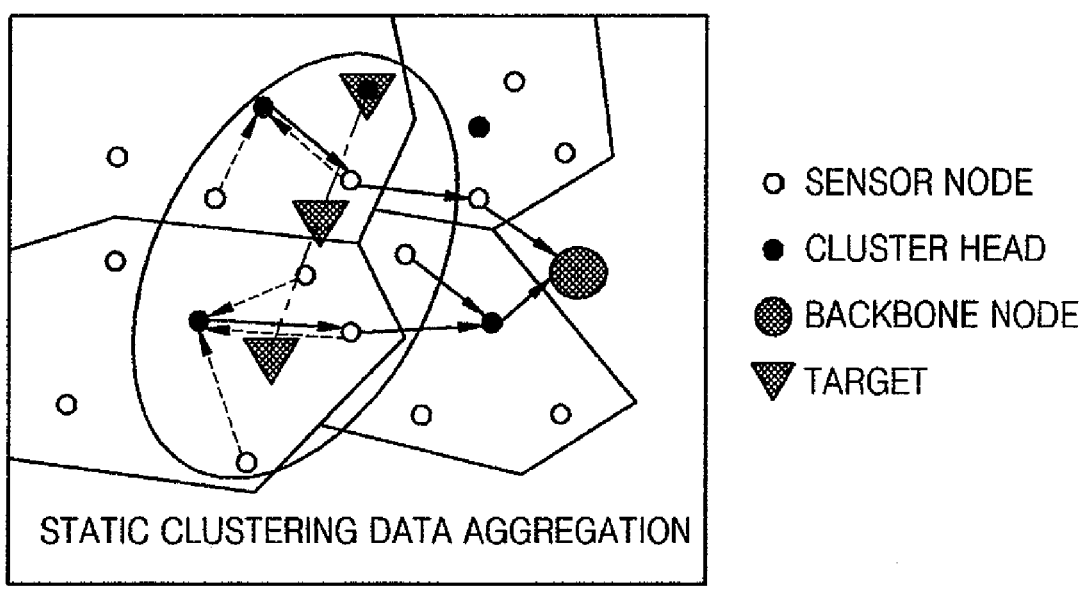

Referring to FIG. 6D, after the dynamic data aggregation method is switched to the static data aggregation method, the network initiates the static data aggregation method. As such, new clusters may not be formed even when the target moves at high speed and thus data is efficiently aggregated.

If the data traffic is reduced again, the backbone node floods the network with control messages and returns to the dynamic data aggregation method.

Figure 7:
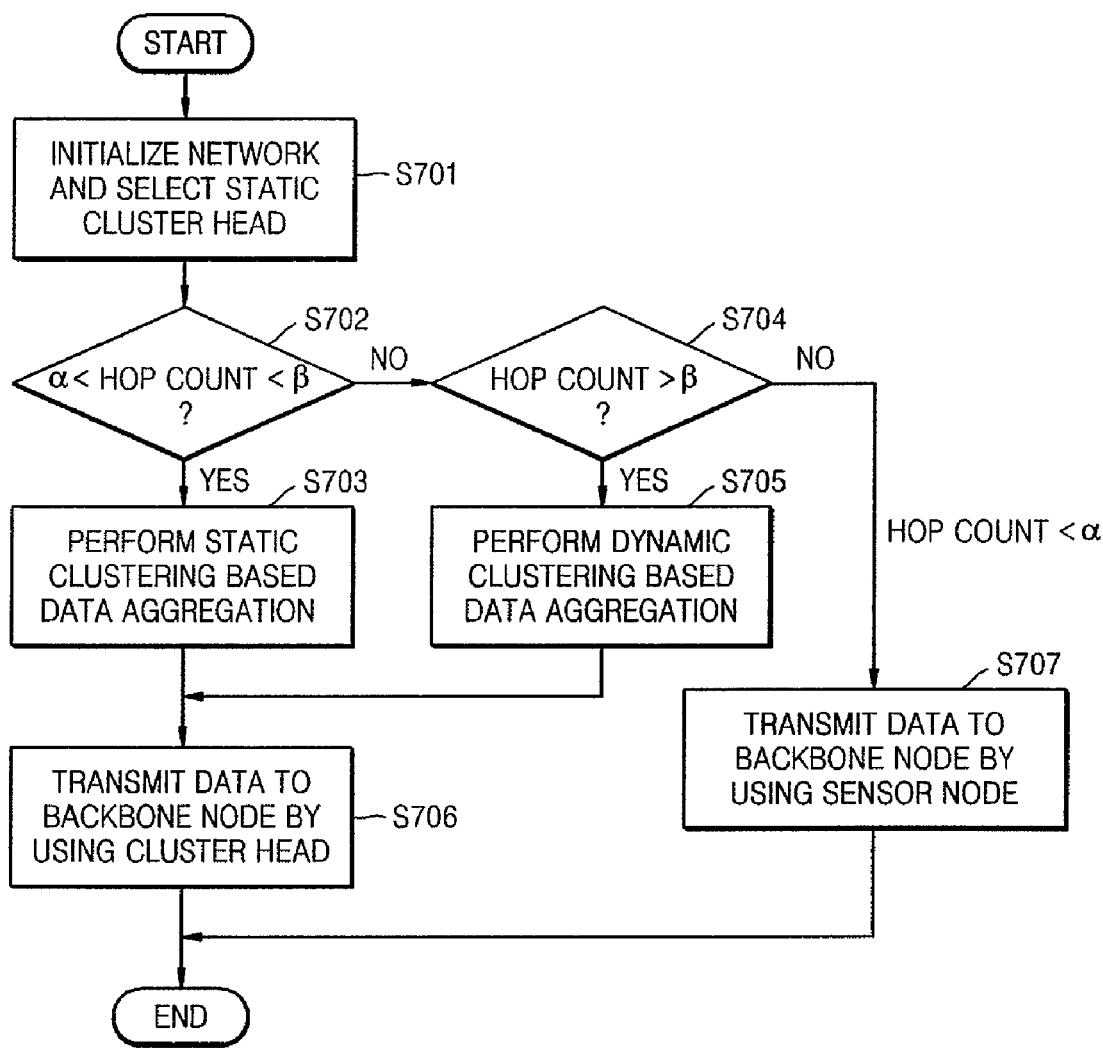
FIG. 7 is a schematic flowchart of a hybrid clustering based data aggregation method according to an embodiment of the present invention.

FIG. 7 is a schematic flowchart of a hybrid data aggregation method according to an embodiment of the present invention.

Referring to FIG. 7, a network is formed by sensor nodes, backbone nodes, and a sink node, and static cluster heads are preselected, in operation S701.

Each sensor node selects a data aggregation method based on a hop count to a backbone node.

It is determined whether the hop count to the backbone node is between preset reference values α and β in operation S702, and, if the hop count is between the reference values α and β, a static data aggregation method is performed in operation S703. The sensor node transmits target sensing data to a preselected cluster head.

It is determined whether the hop count to the backbone node is greater than the reference value β in operation S704, and, if the hop count is greater than the reference value β, a dynamic data aggregation method is performed in operation S705. Sensor nodes that have sensed a target temporarily form a cluster, a cluster head is selected from the cluster, and the sensor nodes transmit target sensing data to the cluster head. In this case, a node that has a highest energy or is the closest to the target in the cluster may be selected as the cluster head.

Cluster heads aggregates target sensing data received from cluster nodes and transmits the aggregated data to the backbone node, in operation S706. Target sensing data aggregated by a static cluster head by using the static data aggregation method and target sensing data aggregated by a dynamic cluster head by using the dynamic data aggregation method are transmitted to the backbone node.

If the hop count to the backbone node is smaller than the reference value α, a sensor node directly transmits target sensing data to the backbone node in operation S707.

Figure 8:
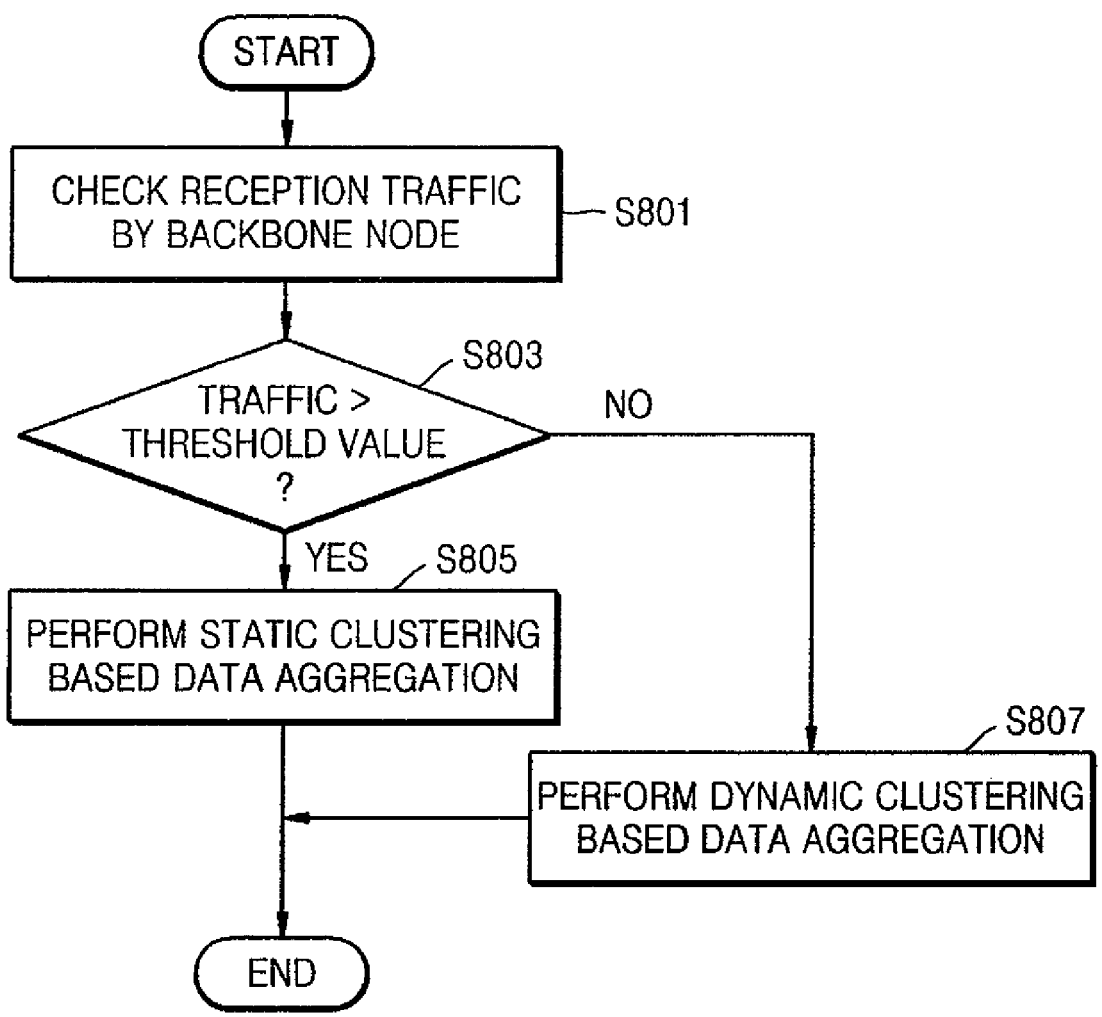
FIG. 8 is a schematic flowchart of an adaptive clustering based data aggregation method according to an embodiment of the present invention.

FIG. 8 is a schematic flowchart of an adaptive data aggregation method according to an embodiment of the present invention.

Referring to FIG. 8, a backbone node checks reception traffic in operation S801. The reception traffic may be checked periodically or in real time.

The backbone node compares the reception traffic to a preset threshold value in operation S803. The backbone node performs a static data aggregation method if the reception traffic is greater than the preset threshold value, in operation S805, and performs a dynamic data aggregation method if the reception traffic is smaller than the preset threshold value, in operation S807.

In other words, the backbone node switches the static and dynamic data aggregation methods according to a state of a network.

Figure 9A:
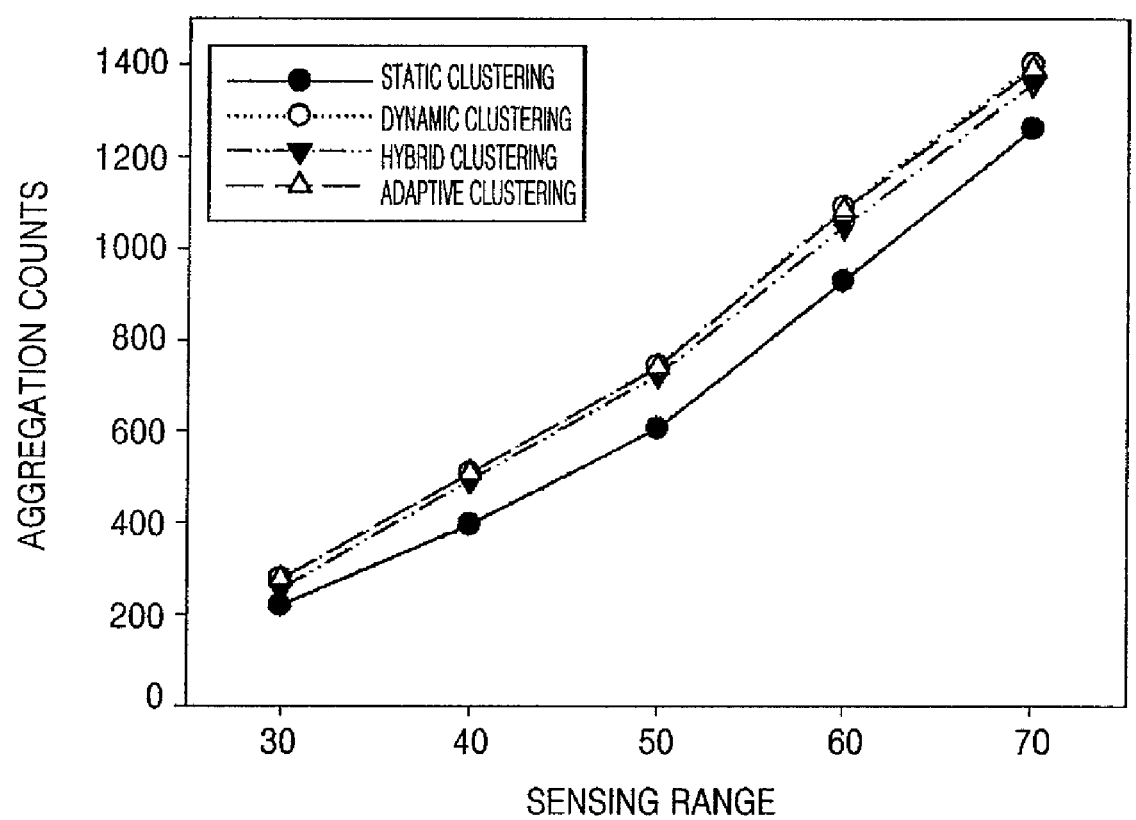
FIGS. 9A and 9B are graphs showing results of simulations regarding performance of a hybrid clustering based data aggregation method and an adaptive clustering based data aggregation method.
Figure 9B:
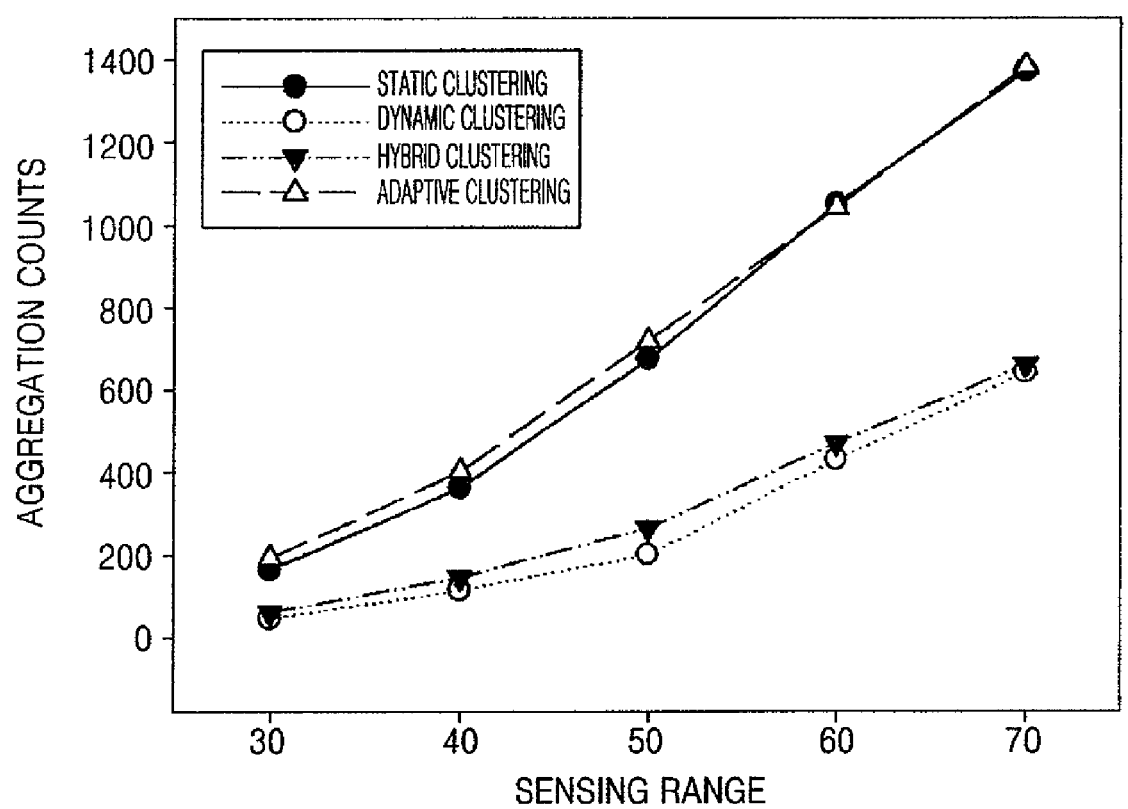

FIGS. 9A and 9B are graphs showing results of simulations regarding performance of a hybrid data aggregation method and an adaptive data aggregation method. FIG. 9A is a graph of a static target and FIG. 9B is a graph of a moving target. Each graph is obtained with respect to a static data aggregation method, a dynamic data aggregation method, a hybrid data aggregation method, and an adaptive data aggregation method.

The simulations were performed with respect to three targets (static targets and moving targets) in an area of 500 m² in which one hundred and fifty sensor nodes are randomly arranged. In each simulation, time was set as 100 sec., a data rate was set as 250 kbps, a transmission power was set as 100 m, reference values α and β for the hybrid data aggregation method were respectively set as values 2 and 5, a threshold value for the adaptive data aggregation method was set as 5 packet/s, and a data aggregation time of a cluster head was set as 200 msec.

Referring to FIG. 9A, with respect to the static target, aggregation counts of the dynamic data aggregation method, the hybrid data aggregation method, and the adaptive data aggregation method are excellent.

Referring to FIG. 9B, with respect to the moving target, aggregation counts of the static data aggregation method and the adaptive data aggregation method are excellent.

In particular, the adaptive data aggregation method has excellent aggregation counts regardless of whether a target moves or not.

An efficient data aggregation method in a network including a backbone node that relays data between a sink node and sensor nodes has been particularly described above. However, it will be understood by one of ordinary skill in the art that the present invention can also be applied to a network formed by only the sink node and the sensor nodes without the backbone node.

In alternative embodiments, hard-wired circuitry may be used in place of or in combination with a processor/controller programmed with computer software instructions to implement the invention. Thus, embodiments of the invention are not limited to any specific combination of hardware circuitry and software.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed by programmers of ordinary skill in the art to which the present invention pertains.

As described above, according to the present invention, operations may be distributed between nodes by transmitting sensing data of multiple targets to a sink node through a plurality of backbone nodes.

Also, due to the use of backbone networks, data may be transmitted to a sink node at a higher speed than a general sensor network, and thus network speed may be improved.

Furthermore, by using one of a hybrid data aggregation method and an adaptive data aggregation method each of which uses clustering based methods between sensor nodes in an area covered by a single backbone node, energy consumption of each sensor node may be reduced, and data transmission delay and overall data traffic may be reduced due to a reduction of data packets. As a result, the lifetime of a network may increase.

While the present invention has been particularly shown and described with reference to exemplary embodiments thereof, it will be understood by one of ordinary skill in the art that various changes in form and details may be made therein without departing from the spirit and scope of the present invention as defined by the following claims.

The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A clustering based data aggregation method for multi-target tracking in a sensor network, the method comprising:
   selecting, by a first sensor node, a cluster head from a cluster in a backbone network based on a hop count to a backbone node for relaying target sensing data from the first sensor node to a sink node; and
   transmitting the target sensing data to the cluster head such that the cluster head aggregates the target sensing data of the first sensor node and target sensing data of other sensor nodes included in the cluster and transmits the aggregated target sensing data to the backbone node.

2. The method of claim 1, wherein
   if the hop count is greater than a preset first reference value, then the selected cluster head is a first cluster head from a cluster which is temporarily formed between sensor nodes which have sensed a target; and
   if the hop count is smaller than the first reference value and is greater than a preset second reference value, then the selected cluster head is a second cluster head from a preset cluster.

3. The method of claim 2, further comprising:
   determining, by a second sensor node, whether a second hop count to the backbone node is smaller than the second reference value; and
   if the second hop count is smaller than the second reference value, directly transmitting second target sensing data from the second sensor node to the backbone node.

4. A clustering based data aggregation method for multi-target tracking in a sensor network, the method comprising:
   determining by a first sensor node, a data aggregation method based on a hop count to a backbone node for relaying target sensing data from the first sensor node to a sink node; and
   transmitting the target sensing data to the backbone node through a cluster head of a cluster which is formed between sensor nodes in a backbone network, according to the determined data aggregation method.

5. The method of claim 4, wherein
   if the hop count is greater than a preset first reference value, then the cluster head is a first cluster head of a dynamic cluster which is temporarily formed between sensor nodes which have sensed a target, and aggregating the target sensing data of the first sensor node and target sensing data of other sensor nodes and transmitting the aggregated target sensing data by using the first cluster head; and
   if the hop count is smaller than the first reference value and is greater than a preset second reference value, then the cluster head is a second cluster head of a preset static cluster, and aggregating the target sensing data of the first sensor node and target sensing data of other sensor nodes and transmitting the aggregated target sensing data by using the second cluster head.

6. The method of claim 5, further comprising:
   determining, by a second sensor node, whether a second hop count to the backbone node is smaller than the second reference value; and
   if the second hop count is smaller than the second reference value, directly transmitting second target sensing data from the second sensor node to the backbone node.

7. A clustering based data aggregation method for multi-target tracking in a sensor network, the method comprising:
   checking reception traffic by using a backbone node for relaying target sensing data from sensor nodes in a backbone network to a sink node; and
   flooding the backbone network with control messages for changing a data aggregation method of the sensor nodes in the backbone network, based on the reception traffic.

8. The method of claim 7, wherein the data aggregation method is either:
   a dynamic data aggregation method in which a cluster head of a cluster which is temporarily formed between sensor nodes which have sensed a target, aggregates the target sensing data; or
   a static data aggregation method in which a cluster head of a preset cluster aggregates the target sensing data.

9. The method of claim 8, wherein the flooding the backbone network with control messages comprises:
   if the reception traffic is greater than a preset threshold value and the data aggregation method is the dynamic data aggregation method, then the control messages are first control messages for changing the dynamic data aggregation method into the static data aggregation method; and
   if the reception traffic is less than the threshold value and the data aggregation method is the static data aggregation method, then the control messages are second control messages for changing the static data aggregation method into the dynamic data aggregation method.

10. A clustering method for multi-target tracking in a sensor network, the method comprising:

temporarily forming a cluster with respect to a target which is sensed by first sensor nodes of which hop counts to a backbone node for relaying first target sensing data from the first sensor nodes in a backbone network to a sink node, are greater than a preset first reference value, and aggregating the first target sensing data by using a first cluster head which is selected from among the first sensor nodes in the cluster; and transmitting second target sensing data to a second cluster head of a preset cluster by using second sensor nodes of which hop counts to the backbone node are less than the first reference value and are greater than a preset second reference value, and aggregating the second target sensing data by using the second cluster head.

11. A clustering method for multi-target tracking in a sensor network, the method comprising:

if reception traffic of a backbone node for relaying target sensing data from sensor nodes in a backbone network to a sink node, is greater than a preset threshold value, changing to a static data aggregation method in which the sensor nodes transmit the target sensing data to a cluster head of a preset cluster and the cluster head aggregates the target sensing data and transmits the aggregated target sensing data; and if the reception traffic is less than the threshold value, changing to a dynamic data aggregation method in which a cluster is temporarily formed between sensor nodes which have sensed a target, and a cluster head selected from among the sensor nodes in the cluster aggregates the target sensing data and transmits the aggregated target sensing data.

12. A sensor network for multi-target tracking, the sensor network comprising:

sensor nodes which are randomly arranged in the sensor network and sense a target; and a backbone node which covers one of a plurality of backbone networks formed in the sensor network, and relays target sensing data of sensor nodes in a corresponding backbone network, to a sink node.

13. The sensor network of claim 12, wherein the backbone node communicates with the sensor nodes by using a low-speed protocol having a low efficiency, and wherein the backbone node communicates with other backbone nodes or the sink node by using a high-speed protocol having a high efficiency.

14. The sensor network of claim 12, wherein the sensor nodes transmit the target sensing data to cluster heads of corresponding clusters formed in the backbone network, based on hop counts to the backbone node, in order to aggregate the target sensing data, and wherein the backbone node dynamically changes a data aggregation method of the sensor nodes in the backbone network based on reception traffic.

* * * * *